Dec. 17, 1968  M. L. CRIPE  3,416,314
HYDRAULIC PRESSURE HOLD-OFF AND BOOSTER MEANS
Filed March 30, 1967
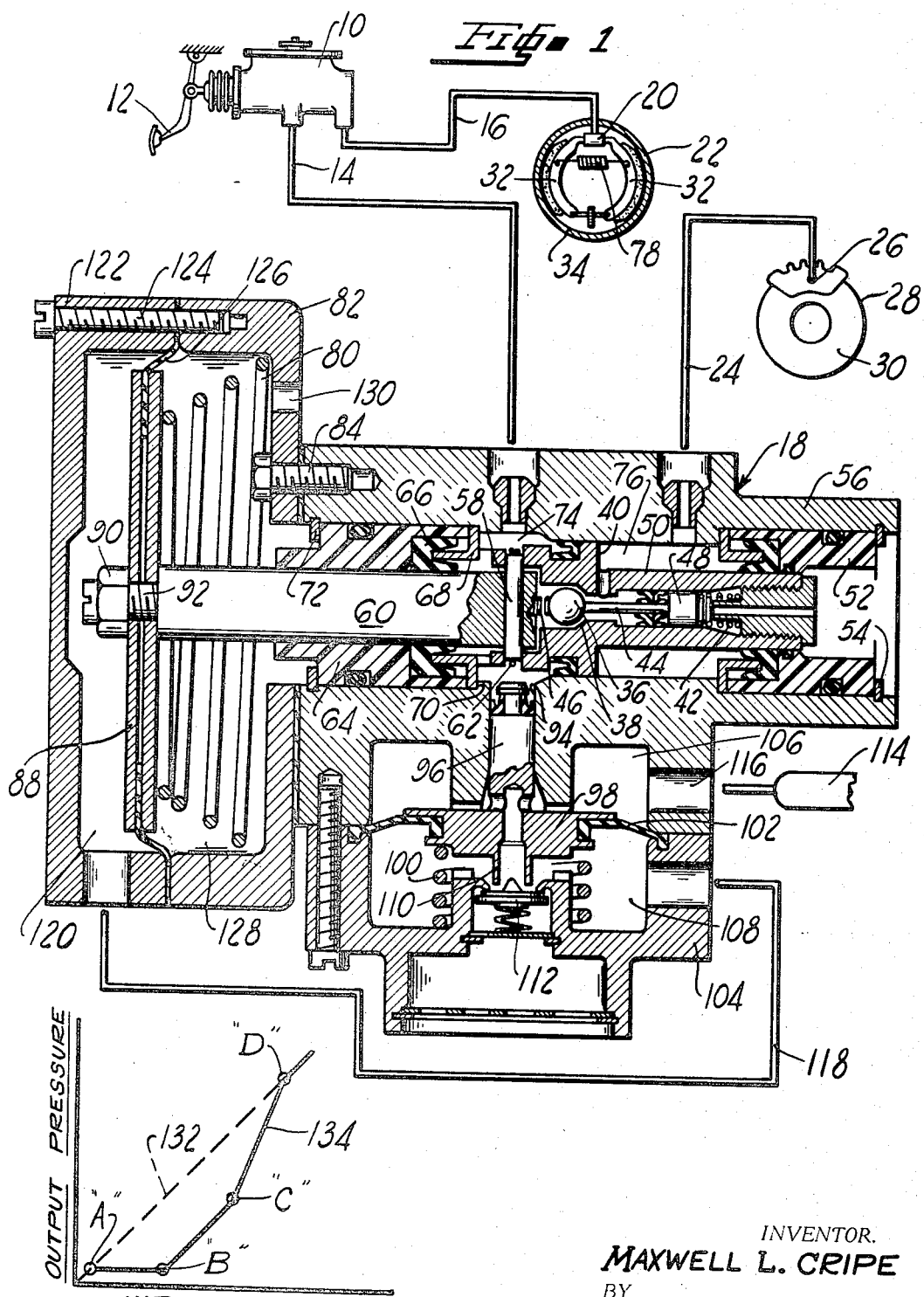
INVENTOR.
MAXWELL L. CRIPE
BY
Richard G. Geib
ATTORNEY

United States Patent Office 3,416,314
Patented Dec. 17, 1968

3,416,314
HYDRAULIC PRESSURE HOLD-OFF AND BOOSTER MEANS
Maxwell L. Cripe, South Bend, Ind., assignor to The Bendix Corporation, a corporation of Delaware
Filed Mar. 30, 1967, Ser. No. 627,164
11 Claims. (Cl. 60—54.5)

ABSTRACT OF THE DISCLOSURE

A hydraulic pressure regulating device in a hydraulic system between an actuator and a motor, which device initially permits flow from the actuator to the motor, terminates it for a period, holds back pressure for a period thereafter and returns full pressure potential upon full release of the means holding back pressure which includes a pressure responsive valve controlling a pressure hold-off motor by a fluid actuated valve means.

SUMMARY

Modern day automobile manufacturers have begun to appreciate the simplicity of disc brakes. Presently automobiles are being furnished with disc brakes on the front wheels and drum brakes on the rear wheels. Disc brakes on all four wheels have had some acceptance, but complications in providing emergency or parking brakes of mechanical design have, thus, far, presented economical hurdles. The compromise of this interim period has also had obvious problems, especially in the area of matching disc and drum brakes.

As those in the art to which this invention is addressed realize the heavy spring loads within a drum brake are not attendant to the disc brakes. Therefore, during initial pressure development by a master cylinder, valves must be provided to permit disc pads to be placed against the rotors and the shoes against the drums to achieve an optimum balance between front and rear wheel brakes. Such valves have heretofore never, after opening flow from the actuator to the brakes, considered the effect of weight transfer by deceleration. Usually, if at all, those who saw this problem have theorized it could be best solved by still another valve.

This invention is to provide a single pressure regulating device that by monitoring hydraulic pressure not only controls brake balance, but provides means to gradually return the relationship of input pressure to output pressure to a 1 to 1 ratio in accordance with deceleration effected weight transfer to maintain such balance and thereby optimize the controlled stopping distance of a vehicle.

DRAWING DESCRIPTION

FIGURE 1 is a cross sectional side view of a device in accordance with this invention installed in a schematic brake system of an automobile; and FIGURE 2 is a graphical illustration of the braking performance to be expected with a device according to the principles of this invention in a brake system as shown by FIGURE 1.

DETAILED DESCRIPTION

With reference now to FIGURE 1 there is shown a brake master cylinder 10 that is actuated by a pedal 12 to develop separate hydraulic pressures in conduits 14 and 16.

Conduit 14 connects the master cylinder or actuator 10 to a pressure regulating device 18; whereas conduit 16 connects master cylinder 10 to a wheel cylinder 20 of rear drum brakes 22 of an automobile. The pressure regulating device is connected by a conduit 24 to a motor 26 of the automobile's front disc brakes 28. The hydraulic pressure from conduit 14 will, during initial movement of brake pedal 12, pass through the device 18 to conduit 24 so as to bring brake pads (not shown) into contact with rotor 30, simultaneously with movement of shoes 32, as by wheel cylinder 20 towards brakes drum 34.

After the contact of the pads with the rotor 30, ball check 36 will move onto seat 38 of slave piston 40 in that this initial pressure overcomes spring 42 biasing valve piston stem 44 to overcome spring 46 between piston 40 and ball check 36. These springs have been chosen in a preferred form to take about 20 p.s.i. on piston 48 to permit closure of valve 36.

Piston 40 is formed to have a tubular body 50 sealingly projecting through an end closure 52 held by a snap ring 54 in the right end of a bore in housing section 56. Piston 40 is joined by a cross pin 58 to a push rod 60 preferably of equal diameter with respect to body 50. The pin is held within a hole through piston 40 by a spring retainer 62. The push rod 60 projects beyond the left of the bore in housing section 56. It passes through a plastic guide 64 having a lip seal 66. A seal retainer 68 abuts a shoulder 70, when guide 64 is located by a snap ring 72.

Thus, the rod 60 and the piston 40 with its tubular projection 50 prescribe a follow-up chamber 74 and a pressure developing chamber 76 in the bore of housing section 56, and the area of the piston surfaces facing each such chamber is equal whereby when valve 38 is closed, an increase in actuating pressure in chamber 74 will be able to create an equal pressure increase in chamber 76.

However, as the preselected pressure which engages the brake pads onto rotor 30 is lower than that required to overcome return spring 78 of the rear drum brakes 22, deceleration forces for the automobile begin with front disc brakes 28. As those skilled in the art will no doubt appreciate this can be varied by proper selection of size of pistons in wheel cylinder 20. In order now to hold-off further actuation of the front disc brakes 28 the push rod 60 connects piston 40, centrally of a return spring 80 installed between a housing section 82, joined by bolts 84 to section 56, to a diaphragm plate assembly 88. As seen, the assembly 88 is attached by a nut 90 to the threaded extension 92 of rod 60 passing through the plate assembly 88. The area of diaphragm assembly 88 is chosen to resist movement of rod 60 until approximately 200 p.s.i. is developed in chamber 74 and wheel cylinders 20. This pressure may also vary in order to accommodate proper matching of deceleration forces from the front and rear brakes.

In any event with the design shown pressure above 200 p.s.i. from the master cylinder will produce pressure that provides substantially equal deceleration forces from both front and rear brakes. It is all the while being supplied via a transverse bore 94 in housing section 56 to a control valve piston 96 that has a hollow hub 98 biased by a spring 100 to resist such movement until the pressure in chamber 74, open to bore 94, reaches a value which references the point of shifting of weight from the rear wheels to the front wheels due to deceleration forces on the automobile.

As the hub 98 is sealed about its periphery by a diaphragm 102 whose periphery seals the connection of control valve housing 104 to housing section 56, chambers 106 and 108 are communicated via a tubular valve seat 110, so that until piston 96 moves seat 110 onto poppet 112, vacuum from intake manifold 114 to port 116 is communicated via conduit 118 to a control chamber 120 between the diaphragm plate assembly 88 and end housing section 122, which is joined by bolts 124 to section 56 with the peripheral portion of diaphragm 126 sealingly interposed.

Chamber 128 behind diaphragm 126 is opened via passage 130 to atmospheric pressure.

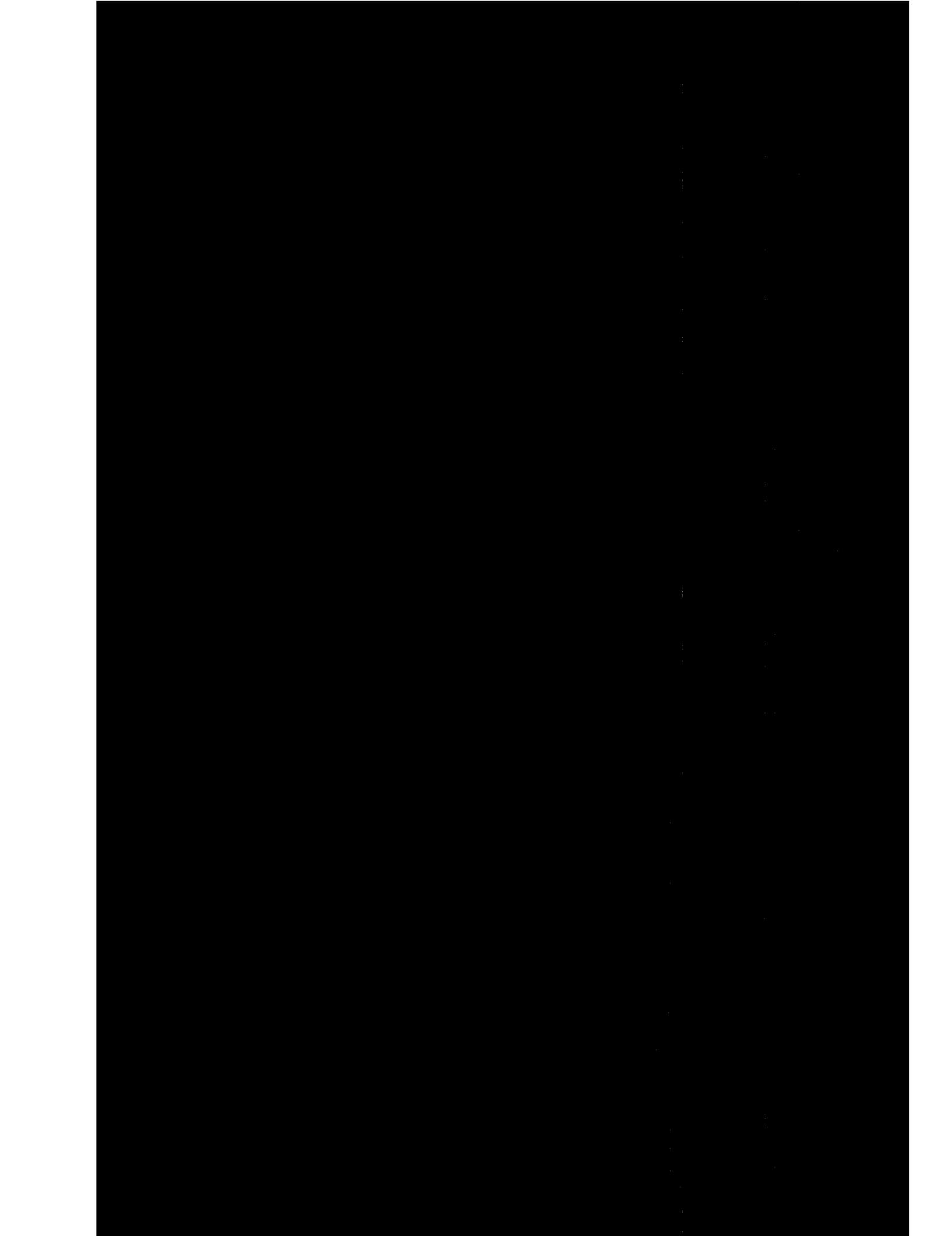

back said piston until a predetermined pressure is reached in said first variable volume chamber.

10. A pressure regulating device according to claim 9 wherein the diameter of said tubular body and said push rod are equal whereby the effective area of said piston in said first variable volume chamber is equal to that in said second variable volume chamber.

11. A servomotor for regulating the supply of hydraulic pressure comprising:

a servomotor housing having a movable wall therein;

a hydraulic cylinder connected to said housing having a piston therein operatively connected to said movable wall, said piston having equal effective areas presented to a follow-up chamber on one side and a pressure generating chamber on the other with a pressure controlled valve means monitoring a fluid passage through said piston communicating said chambers; and a control valve means including a means responsive to pressure in said follow-up chamber to provide a hold-back pressure on said movable wall in accordance with a pressure in said follow-up chamber, said valve means diminishes said hold-back pressure to suspend said movable wall in atmosphere eventually whereby an increase in input pressure provides an equal increase in output pressure from said hydraulic cylinder.

References Cited

UNITED STATES PATENTS 2,607,321   8/1952   Lado _____ 60—54.5 XR

MARTIN P. SCHWADRON, *Primary Examiner.*

R. R. BUNEVICH, *Assistant Examiner.*

U.S. Cl. X.R.

60—10.5